W. C. Spellman,

Broom Head.

No. 88,922. Patented Apr. 13, 1869.

Witnesses:
C. A. Pettit
S. C. Kemon

Inventor:
W. C. Spellman
by Munn & Co.
Attorneys.

W. C. SPELLMAN, OF BALTIMORE, MARYLAND.

*Letters Patent No. 88,922, dated April 13, 1869.*

IMPROVED BROOM-HEAD.

*The Schedule referred to in these Letters Patent and making part of the same.*

*To all whom it may concern:*

Be it known that I, W. C. SPELLMAN, of the city and county of Baltimore, and State of Maryland, have invented a new and improved Broom-Head; and I do hereby declare that the following is a full, clear, and exact description of the construction and operation of the same, reference being had to the accompanying drawings, making a part of this specification, in which—

Figure 1:
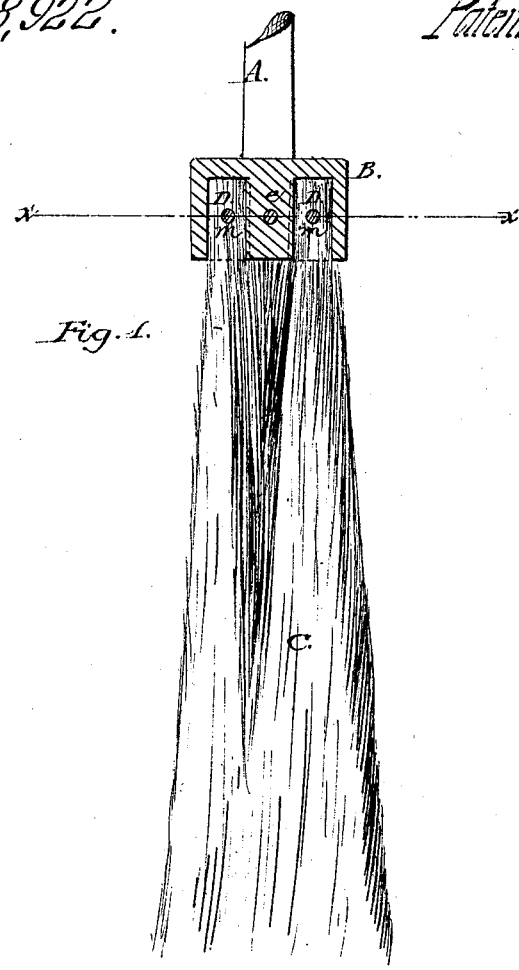
Figure 1 is a section through line $y\,y$ of fig. 2.

The object of this invention is to provide a new and improved mode of fastening the brush to the head.

In the drawings—

A represents the handle;

B, the head; and

C C, the brush or corn.

Figure 2:
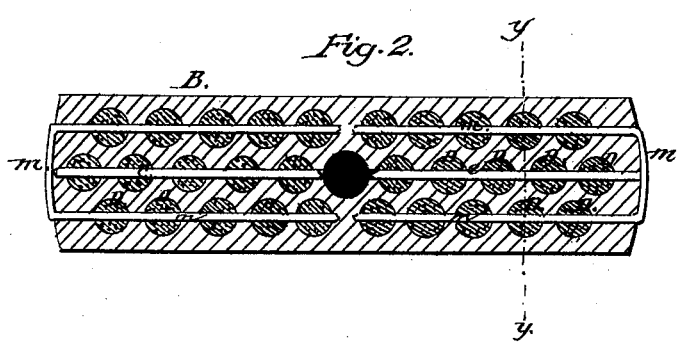
Figure 2 is a section through line $x\,x$ of fig. 1.

The under side of the head is pierced with holes, D D, arranged in rows, as shown in fig. 2.

The but-ends of the corn are inserted into these holes, in the manner shown in fig. 1, and are confined therein by means of a pin, $e$, and a bent rod or staple, $m$, the bent end of the rod passing over the head of the pin, and securing the latter in place.

A single pin may be employed; or, instead, three or more at each end of the head may be used; or, bent rods alone may be inserted, at the option of the maker.

The rods or pins secure the corn firmly in place, and, at the same time, allow it to be readily removed when worn out, and a new brush inserted in lieu of it.

Having thus described my invention,

What I claim as new, and desire to secure by Letters Patent, is—

The head C, pierced with holes D D, arranged in rows, as described, in combination with pins, which pass through the heads of the corn, in the manner and for the purpose specified.

To the above specification of my invention I have signed my hand, this 10th day of February, 1869.

W. C. SPELLMAN.

Witnesses:
CHAS. A. PETTIT,
F. C. BEACH